United States Patent [19]
Strange et al.

[11] Patent Number: 5,894,402
[45] Date of Patent: Apr. 13, 1999

[54] ELECTROLYTIC CAPACITOR AND HEAT SINK ASSEMBLY

[75] Inventors: Thomas F. Strange, Crossroads, Ala.; Paul Lunsmann, Birchgrove, Australia

[73] Assignee: Pacesetter, Inc., Sunnyvale, Calif.

[21] Appl. No.: 08/978,212

[22] Filed: Nov. 25, 1997

[51] Int. Cl.$^6$ ............................... H01G 2/08; H01G 4/32
[52] U.S. Cl. .................. 361/514; 361/508; 361/511; 361/516; 361/537
[58] Field of Search ..................... 361/301.3, 301.4, 361/301.5, 514, 508, 511, 516, 518, 519, 528, 530, 532, 534, 536, 535, 537, 704, 707, 761, 719, 720, 690; 29/25.03

[56] References Cited

U.S. PATENT DOCUMENTS

| | | | |
|---|---|---|---|
| 5,021,927 | 6/1991 | Schweikert et al. | 361/514 |
| 5,131,388 | 7/1992 | Pless et al. | 128/419 |
| 5,373,418 | 12/1994 | Hayashi | 361/707 |
| 5,400,211 | 3/1995 | Evans | 361/517 |
| 5,522,851 | 6/1996 | Fayram | 607/5 |

FOREIGN PATENT DOCUMENTS

| | | | |
|---|---|---|---|
| 125621 | 9/1947 | Australia | 361/301.4 |
| 298761 | 6/1917 | Germany | 361/301.3 |

*Primary Examiner*—Kristine Kincaid
*Assistant Examiner*—Anthony Dinkins
*Attorney, Agent, or Firm*—Steven M. Mitchell

[57] ABSTRACT

An electrolytic capacitor with several conductive layer portions, including some anode layers and some cathode layers in alternating arrangement. A set of insulator layers is interleaved with the conductive layers, and the conductive and insulator layers are laminarly stacked with an anode layer being outermost on one surface. The stack is positioned adjacent a metal heat sink, with an outer insulator layer positioned between and closely contacting the stack and the heat sink. The cathode layers may be connected to the heat sink.

12 Claims, 2 Drawing Sheets

ELECTROLYTIC CAPACITOR AND HEAT SINK ASSEMBLY

FIELD OF THE INVENTION

The invention relates to capacitors, and more particularly to capacitors for applications requiring substantial heat dissipation capabilities.

BACKGROUND AND SUMMARY OF THE INVENTION

Like many electronic components, capacitors generate heat under certain conditions, and this heat must be controlled and dissipated to avoid component and system damage. Capacitors in particular generate substantial heat when subjected to high ripple currents. When such currents must be tolerated, capacitors must be made robust, requiring them to be larger than would otherwise be desirable. Where miniaturization is particularly critical, designers face an unwelcome tradeoff between size and current handling capacity.

To reduce these disadvantages, heat generating components have been fitted with radiative heat sinks in contact with their external housing surfaces. Such heat sinks may also be in the form of a metal circuit substrate to which the components are mounted. A limitation of conventional heat sinks is that close thermal coupling is difficult. Adhesives used to maintain a large contact area must generally be electrically insulative, which limits their thermal conductivity. Conventional component housings also increase the thermal isolation of the hot conductors in the component and the heat sink. In addition, it is often desirable to provide capacitors with the maximum capacitance per unit volume, and current designs are limited in this respect.

The present invention overcomes the limitations of the prior art by providing an electrolytic capacitor with several conductive layer portions, including some anode layers and some cathode layers in alternating arrangement. A set of insulator layers is interleaved with the conductive layers, and the conductive and insulator layers are laminarly stacked with an anode layer being outermost on one surface. The stack is positioned adjacent a metal heat sink, with an outer insulator layer positioned between and closely contacting the stack and the heat sink. The cathode layers may be connected to the heat sink.

DETAILED DESCRIPTION OF A PREFERRED EMBODIMENT

Figure 1:
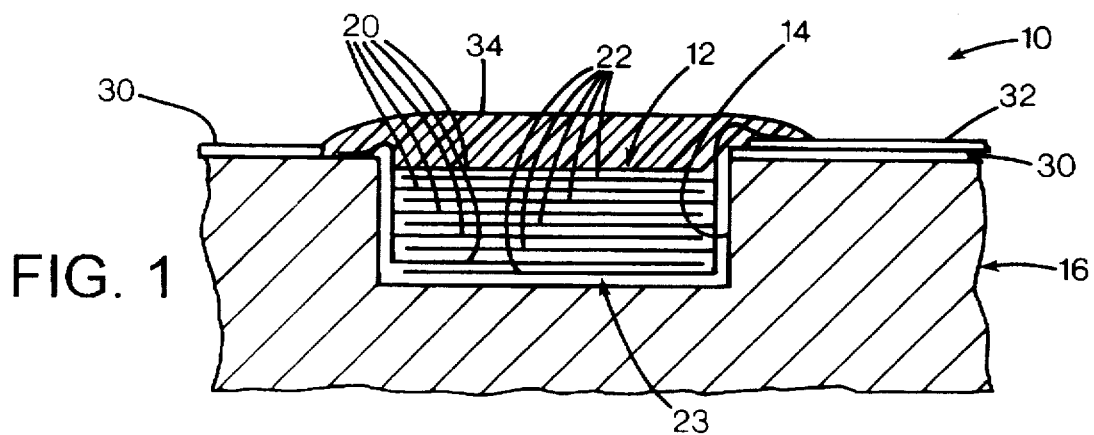
FIG. 1 is a sectional side view of a heat sink-mounted flat capacitor according to a first embodiment of the present invention.

FIG. 1 illustrates a capacitor assembly 10 including a flat capacitor stack 12 mounted within a rectangular recess 14 of an aluminum circuit substrate 16. The capacitor stack, shown somewhat schematically without insulative layers, is a stack of alternating cathode layers 20 and anode layers 22. The anode layers are electrically connected to each other and to circuitry on the substrate or elsewhere, as are the cathode layers. A lowest anode layer 23 is positioned closest to the floor of the recess, and the top conductive layer is a cathode sheet 20.

Figure 2:
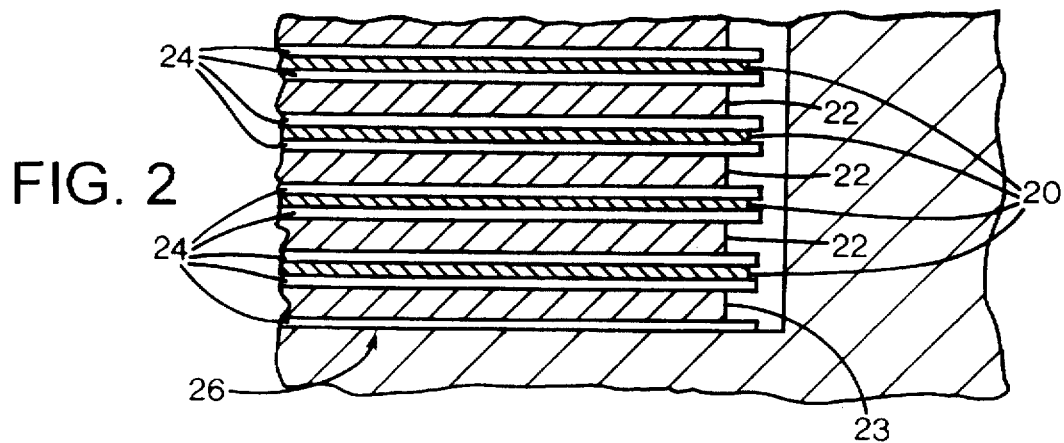
FIG. 2 is an enlarged sectional view of the capacitor of FIG. 1.

As shown in FIG. 2, insulating separator sheets 24 are distributed among the conductive anode and cathode sheets, with one separator between each conductive pair to prevent electrical contact and to maintain a controlled small gap. A lower separator sheet 26 is positioned between the lowest anode layer 23 and the floor of the substrate recess 14 to prevent electrical contact while offering minimal thermal resistance. The anode sheets are undersized relative to the recess so that their edges do not make electrical contact with the substrate, and the separator sheets extend beyond the peripheries of any of the conductive sheets to prevent electrical shorting at any edge.

Referring back to FIG. 1, the substrate has an electrically insulative upper film 30, and a pattern of conductive traces 32 applied to the film, and connecting to other electronic components (not shown). The anode sheets 22 of the capacitor are electrically interconnected to each other, and to an anode contact trace 32, or to any other circuit component as may be needed for a given circuit design. The cathode sheets 20 are interconnected to each other and to the substrate material itself, causing the substrate to function as an additional cathode layer. An epoxy encapsulant 34 may be applied over the capacitor stack to fill the recess, to enhance thermal conduction between the stack edges and the substrate, and to provide an environmental seal and rugged protection for the capacitor layers. In alternative embodiments, an adhesive film may be used to seal the components while maintaining a low profile. In other embodiments where heat is a major concern, a metal heat sink may be adhered atop the film or encapsulant. Also, the chamber defined by the recess and cover may be filed with an electrolyte.

The interaction of the lowest anode layer 23 with the substrate, as spaced apart only by the lowest separator layer 26, provides additional capacitance without using an additional cathode layer. In addition, as the separation between the lowest anode layer 23 and the substrate is extremely small, thermal conductivity is greatly enhanced. With the lowest separator layer having an area of 20 cm², and a thickness of 0.015 cm, a high thermal conductivity geometry coefficient (area divided by thickness) of 1300 cm is provided.

Although not illustrated, the connections between layers may be made by means conventional to flat capacitors. In a preferred embodiment, a set of cathode tabs registered with each other extends beyond the periphery of the separator layers, as disclosed in U.S. Pat. No. 5,522,851 to Fayram, which is incorporated herein by reference. The cathode tabs are then welded or staked together, and connected to desired circuitry. The thicker and more rigid anodes may be provided with tabs and may be welded together before installation in the substrate, with the cathodes defining a cut out near the anode tabs to provide clearance. An aluminum foil conductor may be welded to the anode tab edges, and welded or staked to the circuit as shown. In the preferred embodiment, the anode layer is a 0.004 inch thick sheet of deeply etched ultra pure aluminum with a grain structure that is perpendicular to the surface of the sheet. Each separator is a paper sheet is 0.002 inch thick, and each cathode sheet is 0.0006 inch thick sheet of pure aluminum.

With a typical separator sheet providing minimal spacing of less than 10 microns between the closest anode layer and the heat sink, close thermal coupling is provided.

In a preferred example, each sheet has a width of 5 cm and a length of 4 cm. About 10–30 pairs of anode and cathode sheets are stacked, and a total capacitance of 400 µF is provided. The substrate may also be provided with fins to improve heat dissipation. The substrate functions as a heat sink and an electrical conductor. However, in alternative embodiments in which electrical conduction by the substrate is not desired, an electrically insulative and thermally conductive heat sink material such as ceramic or porcelainized steel may be used.

Figure 3:
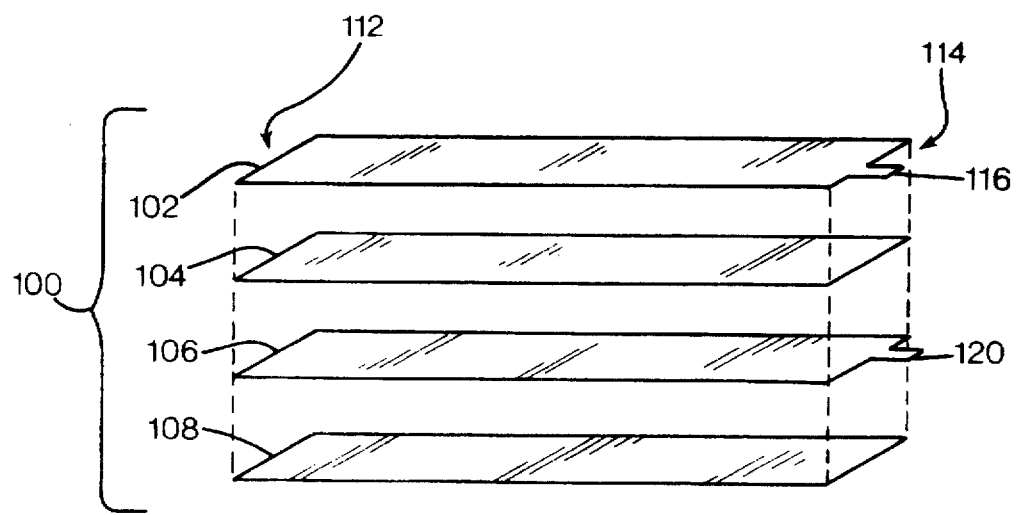
FIG. 3 is an exploded view of the components of a rolled capacitor according to an alternative embodiment of the invention.
Figure 4:
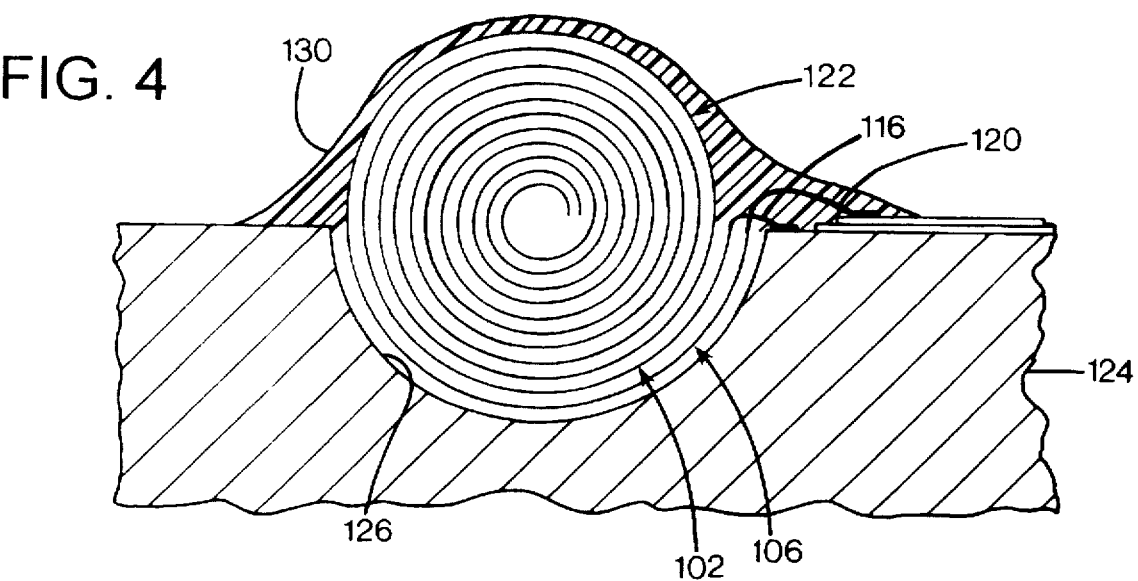
FIG. 4 is a sectional side view of a heat sink-mounted rolled capacitor the embodiment of FIG. 3.
Figure 5:
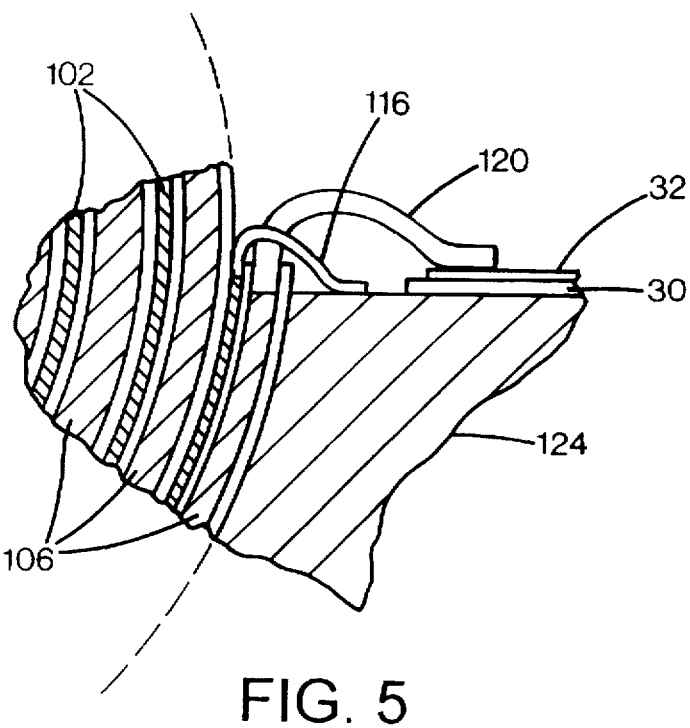
FIG. 5 is an enlarged sectional side view of the capacitor of FIG. 3.

In FIGS. 3, 4, and 5, a rolled cylindrical capacitor according to an alternative embodiment is illustrated. As shown in FIG. 3, a stack 100 of elongated rectangular sheets is prepared, then rolled into the configuration shown in FIGS. 4 and 5. The top sheet is a cathode layer 102, with a first separator 104 below, then an anode sheet 106, and a lower separator layer 108. The sheets are closely stacked to overlay each other, with the separators extending peripherally beyond the conductive sheets as in the preferred embodiment. The stack is described as having an inner end 112 at the left of the illustration, and an outer end 114 at the right. At the outer ends of the cathode and anode sheets, respective tabs 116 and 120 extend from positions offset from each other.

As shown in FIG. 4, the stack is tightly rolled about a core or mandrel into a cylinder 122. The inner end 112 is nearest the center of the cylinder, while the outer end remains at the surface, with tabs exposed. The stack has been rolled with the upper surface of the cathode curved into a convex shape, with the lower separator layer 108 forming the outermost layer of the roll, and the anode forming the next layer below the outer layer.

A metal substrate 124 defines a semi-cylindrical recess 126 having a radius substantially the same as the outside radius of the roll 122, so that the roll may be closely received within the recess for maximum surface contact. As better shown in FIG. 5, the cathode tab 116 is electrically connected to the substrate, adding to the capacitance of the device as in the preferred embodiment, and the anode tab 120 is connected to circuitry 32 that is electrically isolated from the substrate. The roll is encapsulated by an epoxy layer 130, or may be covered by a semi-cylindrical lid or heat sink. If a fully recessed configuration is desired, the recess may be deepened, with straight side walls extending upward to the surface from the semi-cylindrical portion.

One contemplated example of the cylindrical embodiment has elongated sheets of 2 cm width, 50 cm length, and which are rolled to a diameter of 1.5 cm, providing essentially 15 anode-cathode layer pairs from the core to the periphery of the roll. In ideal circumstances using optimally etched anodes, this is expected to provide a capacitance of 400 µF, and to be capable of withstanding ripple currents specified as 25% of rated DC voltage, with contemplated DC voltages of 200–400V. Alternative embodiments are also contemplated for the rolled capacitor based on the variants discussed above with respect to the flat capacitor.

In the disclosed embodiments, the capacitor stack, whether rolled or flat is substantially smaller in area than the surface of the substrate on which it rests. The longest dimension of the substrate is substantially larger than the longest dimension of the stack, so that a significant portion of the substrate extends beyond the stack to effectively radiate generated heat. In the preferred embodiments, the surface area of the upper surface of the substrate not covered by the stack is greater than the area covered by the stack, and substantially so. The exposed rear surface of the substrate further enhances the radiating area.

While the invention is described in terms of a preferred embodiment, the following claims are not intended to be so limited.

We claim:

1. An electrolytic capacitor comprising:
   a plurality of conductive layer portions including a plurality of anode layer portions and a plurality of cathode layer portions in alternating arrangement;
   a plurality of insulative layer portions interleaved between the conductive layer portions;
   the conductive layer portions and insulative layer portions being laminarly configured as a close stack;
   a thermally conductive heat sink substrate having a surface defining a recess wherein the area of the substrate surface is substantially greater than the area of the recess;
   the stack being positioned at least in part within the recess; and
   an outer layer portion of the stack closely contacting the substrate in the recess.

2. The electrolytic capacitor of claim 1 wherein the conductive and insulative layer portions comprise sheets rolled in the form of a cylinder.

3. The electrolytic capacitor of claim 2 wherein the outer layer portion of the stack has a cylindrical surface and wherein the recess has a cylindrical surface portion sized to closely receive at least a portion of the stack.

4. The electrolytic capacitor of claim 1 wherein the stack comprises a plurality of flat sheets, and wherein the recess has a flat bottom to conform to the stack.

5. The electrolytic capacitor of claim 1 wherein at least one of the conductive layer portions is electrically connected to the substrate.

6. The electrolytic capacitor of claim 1 wherein an outer conductive layer is spaced apart from the substrate by less than 10 microns.

7. The electrolytic capacitor of claim 1 wherein the substrate comprises a metal sheet.

8. The electrolytic capacitor of claim 1 wherein each of the insulative layer portions has the same thickness, such that the thickness defines a gap between the substrate and an outer conductive layer portion which is substantially the same as between adjacent ones of the conductive layer portions within the stack.

9. The electrolytic capacitor of claim 1 wherein each of the conductive layer portions is a flat sheet, and wherein the cathode layer portions are electrically connected to the substrate, and electrically isolated from the anode layer portions.

10. The electrolytic capacitor of claim 9 wherein one of the anode layer portions is positioned adjacent one of the insulative layer portions which is positioned adjacent the substrate, such that a capacitive gap is formed between said one of the anode layer portions and the substrate.

11. The electrolytic capacitor of claim 9 wherein the recess has a depth at least as great as the thickness of the stack, such that the stack may be entirely received within the recess.

12. The electrolytic capacitor of claim 1 wherein the plurality of insulative layer portions and the outer layer portion are a single integral sheet.

\* \* \* \* \*